United States Patent
Frenger et al.

(10) Patent No.: US 10,701,620 B2
(45) Date of Patent: Jun. 30, 2020

(54) METHODS, NETWORK NODE AND WIRELESS DEVICE FOR HANDLING ACCESS INFORMATION

(71) Applicant: Telefonaktiebolaget LM Ericsson (publ), Stockholm (SE)

(72) Inventors: Pål Frenger, Linköping (SE); Erik Eriksson, Linköping (SE); Martin Hessler, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 101 days.

(21) Appl. No.: 15/556,017

(22) PCT Filed: Mar. 10, 2015

(86) PCT No.: PCT/SE2015/050267
§ 371 (c)(1),
(2) Date: Sep. 6, 2017

(87) PCT Pub. No.: WO2016/144222
PCT Pub. Date: Sep. 15, 2016

(65) Prior Publication Data
US 2018/0063770 A1    Mar. 1, 2018

(51) Int. Cl.
*H04W 56/00* (2009.01)
*H04W 48/08* (2009.01)
(Continued)

(52) U.S. Cl.
CPC ........... *H04W 48/08* (2013.01); *H04L 5/0048* (2013.01); *H04L 27/227* (2013.01);
(Continued)

(58) Field of Classification Search
CPC . H04L 27/261; H04L 27/2613; H04L 27/227; H04L 41/028; H04W 56/001; H04W 56/002; H04N 5/455
See application file for complete search history.

(56) References Cited

U.S. PATENT DOCUMENTS

| 7,426,394 B2 | 9/2008 | Rinne |
| 9,462,539 B2 | 10/2016 | Frenger et al. |

(Continued)

FOREIGN PATENT DOCUMENTS

| CN | 103283283 A | 9/2013 |
| CN | 104219757 A | 12/2014 |

(Continued)

OTHER PUBLICATIONS

Unknown, Author, "Considerations on SIB for Low Complexity UEs", 3GPP TSG RAN WG2 Ad Hoc, R2-150241, CATT, Feb. 9-13, 2015, 1-6.

(Continued)

*Primary Examiner* — Salvador E Rivas
(74) *Attorney, Agent, or Firm* — Murphy, Bilak & Homiller, PLLC

(57) ABSTRACT

A radio network (600) comprising at least one network node (604) broadcasts access information (AIT) comprising a range of access parameters, using a demodulation reference signal (RS4) out of a set of predefined demodulation reference signals. The radio network (600) also transmits a synchronization signal (SSI 7) associated with a predefined mapping to at least two candidate demodulation reference signals including the demodulation reference signal used for broadcasting the access information. Thereby, a wireless device (602) receiving the synchronization signal is able to demodulate the broadcasted access information and derive (Continued)

valid access related parameters therefrom, based on the synchronization signal (SSI 7).

32 Claims, 5 Drawing Sheets

(51) Int. Cl.
*H04W 74/00* (2009.01)
*H04L 27/227* (2006.01)
*H04L 5/00* (2006.01)
*H04W 84/04* (2009.01)
*H04L 12/24* (2006.01)
*H04N 5/455* (2006.01)
*H04L 12/26* (2006.01)

(52) U.S. Cl.
CPC ..... *H04W 56/001* (2013.01); *H04W 56/0015* (2013.01); *H04W 74/006* (2013.01); *H04L 41/028* (2013.01); *H04L 43/0847* (2013.01); *H04N 5/455* (2013.01); *H04W 84/045* (2013.01)

(56) References Cited

U.S. PATENT DOCUMENTS

| | | | |
|---|---|---|---|
| 9,668,162 | B2 | 5/2017 | Frenger et al. |
| 9,854,465 | B2 | 12/2017 | Zhu et al. |
| 9,860,803 | B2 | 1/2018 | Mochizuki et al. |
| 9,894,624 | B2 | 2/2018 | Yu et al. |
| 9,924,478 | B2 | 3/2018 | Seo et al. |
| 9,992,736 | B2 | 6/2018 | Da Silva et al. |
| 10,098,055 | B2 | 10/2018 | Frenger et al. |
| 10,244,494 | B2 | 3/2019 | Yu et al. |
| 10,341,940 | B2 | 7/2019 | Frenger et al. |
| 2013/0308555 | A1* | 11/2013 | Ho .............. H04L 5/0048 370/329 |
| 2014/0086173 | A1* | 3/2014 | Sadeghi ............ H04L 5/005 370/329 |
| 2014/0295836 | A1 | 10/2014 | Frenger et al. |
| 2014/0307621 | A1 | 10/2014 | Frenger et al. |
| 2015/0058879 | A1* | 2/2015 | Park .............. H04H 20/30 725/31 |
| 2015/0256995 | A1 | 9/2015 | Rune et al. |
| 2016/0142898 | A1* | 5/2016 | Poitau ............ H04W 76/14 370/329 |
| 2017/0150461 | A1* | 5/2017 | Li .............. H04W 56/00 |
| 2018/0063770 | A1 | 3/2018 | Frenger et al. |
| 2019/0021062 | A1* | 1/2019 | Abedini ............ H04J 11/0073 |
| 2019/0387488 | A1* | 12/2019 | Wang .............. H04L 5/10 |

FOREIGN PATENT DOCUMENTS

| | | |
|---|---|---|
| EP | 1901496 A1 | 3/2008 |
| EP | 2783534 A1 | 10/2014 |
| EP | 3269178 A1 | 1/2018 |
| JP | 2012533933 A | 12/2012 |
| JP | 2015528652 A | 9/2015 |
| WO | 2012092066 A1 | 7/2012 |
| WO | 2013077783 A1 | 5/2013 |
| WO | 2014036692 A1 | 3/2014 |
| WO | 2016144222 A1 | 9/2016 |

OTHER PUBLICATIONS

Unknown, Author, "System information acquisition for low complexity and coverage enhanced UEs", 3GPP TSG-RAN WG2 #89, Tdoc R2-150454, Ericsson, Feb. 9-13, 2015, 1-8.

Frenger, et al., "A Clean Slate Radio Network Designed for Maximum Energy Performance", 2014 IEEE 25th International Symposium on Personal, Indoor and Mobile Radio Communications, 2014, pp. 1-5.

Frenger, Pal, et al., "From Always Available to Always Optimized", Towards 5G-5Green System Design, Aug. 27, 2014, pp. 1-28.

Unknown, Author, "5G-Key Component of the Networked Society", RWS-150009, 3GPP RAN Workshop on 5G, Phoenix, Arizona, USA, Sep. 17-18, 2015, pp. 1-55.

* cited by examiner

METHODS, NETWORK NODE AND WIRELESS DEVICE FOR HANDLING ACCESS INFORMATION

TECHNICAL FIELD

The present disclosure relates generally to a network node of a radio network, a wireless device and methods therein, for handling access information broadcasted over a radio coverage area served by the network node.

BACKGROUND

For some years, different types of radio networks have been developed to provide radio communication for various wireless devices in different areas which are typically divided into cells. The radio networks, also commonly referred to as wireless, cellular or mobile networks, are constantly improved to provide better capacity, quality and coverage to meet the demands from subscribers using services and increasingly advanced terminals for communication, such as smartphones and tablets, which often require considerable amounts of bandwidth and resources for data transport in the networks. Therefore, it is often a challenge to achieve high capacity and good performance, e.g. in terms of high data throughput, low latency and low rate of dropped or lost data, in the radio communication between network nodes in the radio network and various wireless devices communicating with the network nodes.

In the field of mobile or wireless communication, the term "wireless device" is often used and will be used in this disclosure to represent any communication entity capable of radio communication with a radio network by sending and receiving radio signals, such as e.g. mobile telephones, tablets and laptop computers. Another common term in this field is "User Equipment, UE". A wireless device in this context could also be a machine-to-machine type of device operating automatically such as a sensor, counter or measuring entity which is configured to send reports over the radio network e.g. at certain intervals or upon certain events. Further, the term "network node", is used here to represent any node of a radio network that is arranged to communicate radio signals with wireless devices. The network node in this context is often also referred to as a base station, radio node, e-NodeB, eNB, NB, base transceiver station, access point, etc.

In order to improve capacity and performance in the radio network, various features can be employed that are intended to make the radio communication more efficient in terms of resource usage. In particular, it is desirable to reduce energy consumption in the network as well as the amount of interference generated by transmissions made by network nodes and wireless devices, which in turn could improve both capacity and performance. It is for example desirable to limit the broadcasting of system information from network nodes, sometimes generally referred to as the "broadcast layer".

FIG. 1 illustrates a communication scenario in a hierarchical network structure comprising a macro node 100 providing radio coverage over a relatively large area C1 and a plurality of network nodes 102 providing radio coverage over much smaller areas C2 substantially within the area C1. The macro node 100 broadcasts system information over the large area C1 which can be read by any wireless devices D present in the area C1 in order to communicate data with the network nodes 102 when present in any of the areas C2. Typically, system information needs to be broadcasted with higher power than what is required for transmitting data to a particular wireless device. This is because the broadcasted system information should be received properly by any wireless device that happens to be present within the large radio coverage area C1, including those that are located at the outskirts of the area C1, while transmitted data only needs to reach one specific device by using a transmit power and direction that can be regulated for proper reception by that device, e.g. within one of the smaller areas C2. It is estimated that around 99% of the total energy consumption for downlink transmissions in a radio network is typically used for broadcasting system information.

One particular topic that has been addressed in this context is the broadcasting of access information containing parameter settings related to how wireless devices in idle mode should send random access messages on a Physical Random Access Channel, PRACH. Such access information thus relates to various parameters to be used by wireless devices when accessing the network, e.g. frequency, synchronization, time window, preamble sequence in the PRACH message, power level, and so forth.

Furthermore, contention-based access may be employed where any wireless device can transmit a message to a serving network node on the PRACH without reserving radio resources in advance, at the risk of collision when two or more wireless devices happen to transmit simultaneously. Further access related parameters settings that may be broadcasted for contention-based access may relate to a back-off timer, power increase step, maximum number of PRACH attempts before back-off, access restrictions e.g. related to certain closed subscriber groups comprising e.g. family members or employees allowed to access a certain network node such as a home base station, and service class or user type priority information such that when there is congestion on the PRACH only certain devices, or devices with certain service requests, are allowed to perform PRACH transmission attempts.

It has been proposed that the same access information should be broadcasted at regular intervals in a synchronized manner over a relatively large area, e.g. by a macro node providing large radio coverage and/or simultaneously by several network nodes each providing smaller radio coverage, so as to reduce and minimize the total broadcast duration and avoid interference. The goal is to transmit as little as possible apart from data transmissions to individual devices. If there are no ongoing data transmissions, the network nodes can turn off their transmitter and enter Discontinuous Transmit mode, commonly known as DTX, to save power. Any idle wireless devices in the area are then able to derive relevant access information from the broadcasted access information based on a specific system signature index sequence, referred to as SSI, received from a network node as a reference to a specific set of access parameters or entry in the broadcasted access information to be used when performing random access towards that network node.

However, different network nodes may need to apply different sets of access related parameters locally in different areas, depending on the current traffic situation in terms of ongoing data communications, the number of wireless devices present in a particular area, the number of random access messages currently being transmitted, and so forth. Moreover, the network nodes may need to switch rapidly between different sets of access related parameters on a dynamic basis so as to adapt the random access procedure to changes in the traffic situation. No solution is known at present to accomplish such flexible use of different access related parameters.

SUMMARY

It is an object of embodiments described herein to address at least some of the problems and issues outlined above. It is possible to achieve this object and others by using a network node, a wireless device and methods therein, as defined in the attached independent claims.

According to one aspect, a method is performed by a radio network comprising at least one network node, for handling access information related to how the radio network can be accessed by at least one wireless device present in a radio coverage area served by the radio network. In this method, the radio network, i.e. the at least one network node therein, broadcasts access information comprising a range of access parameters, using a demodulation reference signal out of a set of predefined demodulation reference signals. The radio network, i.e. the at least one network node therein, also transmits a synchronization signal associated with a predefined mapping to at least two candidate demodulation reference signals including the demodulation reference signal used for broadcasting the access information. Thereby, the at least one wireless device is enabled to demodulate said broadcasted access information and derive valid access related parameters from the broadcasted access information, based on the transmitted synchronization signal.

According to another aspect, a radio network comprising at least one network node is arranged to handle access information related to how the radio network can be accessed by at least one wireless device present in a radio coverage area served by the radio network. Each network node comprises a processor and a memory, said memory comprising instructions executable by said processor whereby the radio network, i.e. the at least one network node therein, is operative to:

broadcast access information comprising a range of access parameters, using a demodulation reference signal out of a set of predefined demodulation reference signals, and transmit a synchronization signal associated with a predefined mapping to at least two candidate demodulation reference signals including the demodulation reference signal used for broadcasting the access information, thereby enabling the at least one wireless device to demodulate said broadcasted access information and derive valid access related parameters from the broadcasted access information, based on the transmitted synchronization signal.

According to another aspect, a method is performed by a wireless device in a radio network, for handling access information related to how the radio network can be accessed in a radio coverage area served by the radio network. In this method, the wireless device receives from the radio network a synchronization signal associated with a predefined mapping to at least two candidate demodulation reference signals. The wireless device also receives broadcasted access information comprising a range of access parameters. The wireless device then derives valid access parameters from the broadcasted access information based on the synchronization signal by demodulating the broadcasted access information using one of the at least two candidate demodulation reference signals.

According to another aspect, a wireless device is arranged to handle access information related to how a radio network can be accessed in a radio coverage area served by the radio network. The wireless device comprises a processor and a memory, said memory comprising instructions executable by said processor whereby the wireless device is operative to:

receive from the radio network a synchronization signal associated with a predefined mapping to at least two candidate demodulation reference signals, receive broadcasted access information comprising a range of access parameters, and derive valid access parameters from the broadcasted access information based on the synchronization signal by demodulating the broadcasted access information using one of the at least two candidate demodulation reference signals.

The above radio network, network node(s), wireless device and methods may be configured and implemented according to different optional embodiments to accomplish further features and benefits, to be described below.

A computer program is also provided comprising instructions which, when executed on at least one processor in the score management node, cause the at least one processor to carry out the method described above for the score management node. A carrier is also provided which contains the above computer program, wherein the carrier is one of an electronic signal, optical signal, radio signal, or a non-tangible computer readable storage medium.

BRIEF DESCRIPTION OF DRAWINGS

The solution will now be described in more detail by means of exemplary embodiments and with reference to the accompanying drawings, in which.

DETAILED DESCRIPTION

By using any of the embodiments described herein, a more flexible use of different access parameters can be achieved, e.g. depending on the current traffic situation, so as to enable the use of "optimal", or near-optimal, access parameters that result in high performance and reduced interference while the energy consumption for broadcasting access information is minimized.

The solution described herein refers to handling of access information related to how a radio network can be accessed. Firstly, the solution involves a procedure and apparatus implemented in a radio network comprising at least one network node, which can be used to get suitable access parameters across to at least one wireless device. Secondly, the solution also involves a procedure and apparatus implemented in a wireless device present in a radio coverage area served by the radio network, which can be used to acquire and apply the suitable access parameters. Briefly described, the radio network broadcasts access information using a predefined demodulation reference signal, and also transmits a synchronization signal associated with a predefined mapping to at least two candidate demodulation reference signals including the demodulation reference signal used for broadcasting the access information. Thereby, a wireless device receiving the synchronization signal is able to demodulate the broadcasted access information correctly and derive valid access related parameters therefrom, based on the synchronization signal.

In this way, the radio network can broadcast the same access information, e.g. in the form of an Access Information Table, AIT, using different demodulation reference signals in different areas e.g. defined by one or more cells, sectors or antenna beams. By transmitting different synchronization signals in the different areas, e.g. in the form of a System Signature Index sequence, SSI, any wireless device can use a received synchronization signal for demodulating the broadcasted access information and derive relevant access parameters, depending on in which area the wireless device is located.

Thus, different sets of access related parameters can be applied in different areas of the network in a flexible manner depending on which demodulation reference signal is used. The flexibility is achieved by the synchronization signal being mapped to two or more demodulation reference signals, one of them being used for broadcasting the access information, such that the radio network can easily switch between these demodulation reference signals in a particular area, without having to change the content of the broadcasted information nor the transmitted synchronization signal, to enforce corresponding sets of access related parameters in that area.

Figure 2:
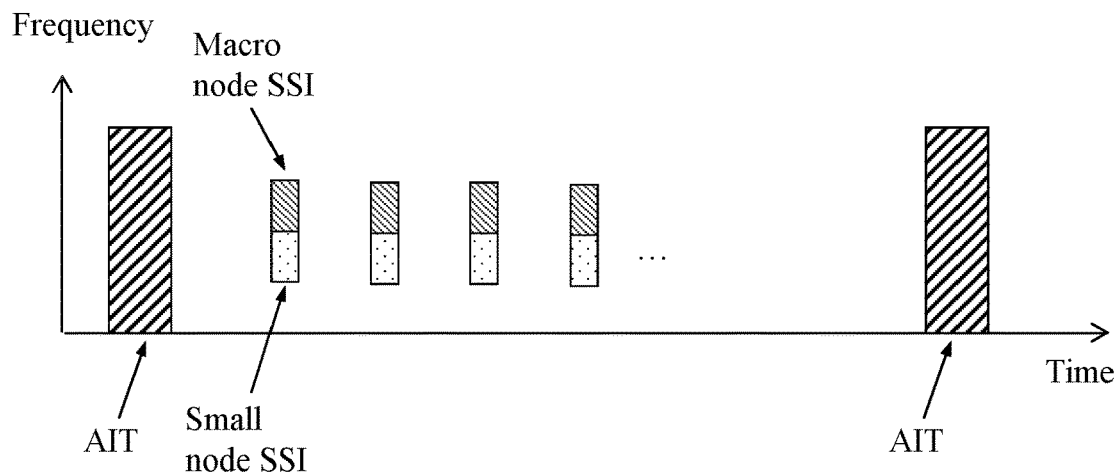
FIG. 2 is a diagram illustrating how access information can be provided from network nodes of a radio network to wireless devices, according to some possible embodiments.

FIG. 2 illustrates schematically how the above-mentioned access information and synchronization signal can be broadcasted and transmitted, respectively, by a radio network. In this example, the access information is broadcasted in an AIT with a certain periodicity over time and the synchronization signal is transmitted in an SSI with another periodicity that may be shorter than the periodicity of the AIT. Technically, time separation of AIT and SSI is not required and they may be separated in frequency as well, or by a combination of time/frequency/code. The periodicity of the AIT may be the same as for the SSI in some cases, e.g. when the network only contains one transmitting network node it may be desirable to transmit the AIT and SSI together at the same time.

Figure 1:
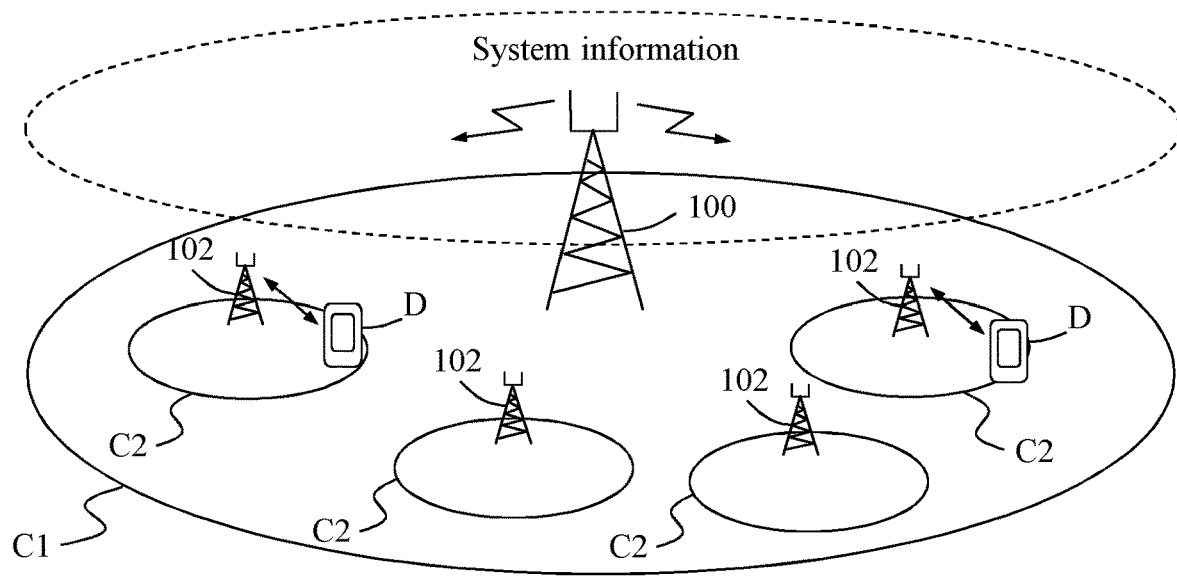
FIG. 1 is a communication scenario where system information is broadcasted from a macro node providing large radio coverage and wireless devices communicate data with network nodes providing smaller radio coverage, according to the prior art.

The AIT may be broadcasted over a large area, e.g. by the macro node 100 shown in FIG. 1, and different SSIs may be transmitted in different smaller areas within the large area, e.g. by different "smaller" network nodes such as the network nodes 102 shown in FIG. 1. Alternatively, the different SSIs may be transmitted by the same network node in different directions such as sectors or antenna beams.

Once a wireless device has received an SSI in a particular area, it will identify at least two candidate demodulation reference signals according to the above-described predefined mapping, which is assumed to be known to the device. The wireless device will then attempt to demodulate the broadcasted AIT using the at least two candidate demodulation reference signals separately, until the demodulation is successful since one of them was used for broadcasting the AIT. The term "candidate" implies that the device does not know which demodulation reference signal is the correct one until it has attempted to demodulate the AIT.

FIG. 2 further illustrates that the broadcasting of AIT and transmission of SSI are separated in time, and that SSI is transmitted with a considerably shorter periodicity than the broadcasted AIT to ensure that the device has received the SSI before receiving the AIT. It is also shown that an SSI may be transmitted by both a macro node and by a "small" node. The AIT may be transmitted by both a macro node and smaller nodes as well. The SSI, or generally the synchronization signal, is effectively a "key" to the correct and valid access parameters in the broadcasted access information, e.g. the AIT.

For example, it may be desirable to broadcast any system information and access information, e.g. on a Physical Broadcast Channel, PBCH, in a so-called "Single Frequency Network", SFN, transmission format, which means that the same information is broadcasted over a large area. However, that is not possible in a network using a one-to-one mapping between the synchronization signal and the demodulation reference signal used for broadcasting the information. The one-to-one mapping discussed above is not optimized for utilizing e.g. beam-forming gains or macro diversity gains.

Figure 3:
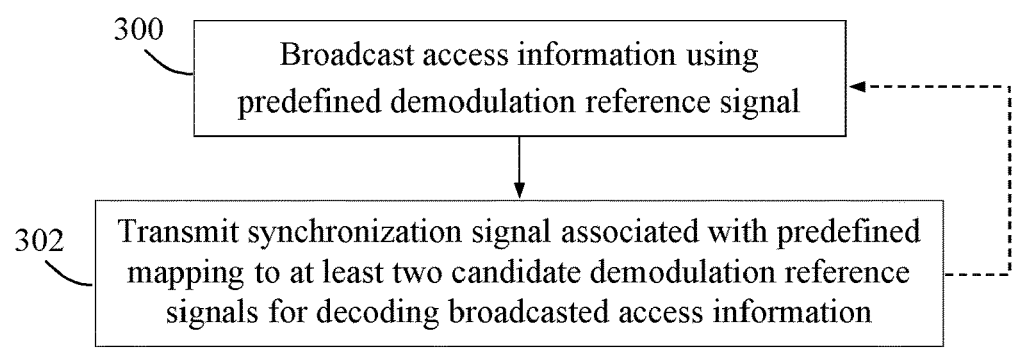
FIG. 3 is a flow chart illustrating a procedure performed by at least one network node of a radio network, according to further possible embodiments.

An example of how the solution may be employed on the network side will now be described with reference to the flow chart in FIG. 3 which illustrates a procedure with actions performed by a radio network comprising at least one network node, to accomplish the functionality described above. FIG. 3 can also be seen as a procedure with actions performed by one or more network nodes of a radio network. The radio network is operative to handle access information related to how the radio network can be accessed by at least one wireless device present in a radio coverage area served by the radio network. A "network node" in this context may be a base station or equivalent which operates to transmit and receive radio signals, but it may also be a control node such as a network management node, a Radio Network Controller, RNC, or an Operation & Maintenance, O&M, node, which operates to control and instruct one or more base stations to communicate radio signals. Further, the following actions may be performed by one and the same network node or by two or more different network nodes in the radio network.

A first action 300 illustrates that the radio network broadcasts access information comprising a range of access parameters, using a demodulation reference signal out of a set of predefined demodulation reference signals. In a possible embodiment, the radio network may broadcast the access information in an Access Information Table, AIT, which has been described above.

The broadcasted access information may relate to various access parameters to be used by wireless devices when accessing the network. Some typical but non-limiting examples of such access parameters that the device needs to know include transmit frequency, synchronization, time window for random access, a preamble sequence to use in a PRACH message, power level, a back-off timer, power increase step, a maximum allowed number of transmission attempts before back-off, access restrictions related to certain subscriber groups or types, and service class or user type priority information indicating that only certain devices or certain service requests are allowed for random access transmissions when the access channel is congested.

In a next shown action 302, the radio network transmits a synchronization signal associated with a predefined mapping to at least two candidate demodulation reference signals including the demodulation reference signal used for broadcasting the access information. This mapping is thus "predefined" in the sense that both the network and the at least one wireless device have knowledge about the mapping. Thereby, the at least one wireless device is enabled to demodulate the broadcasted access information and derive valid access related parameters from the broadcasted access information, based on the transmitted synchronization signal.

In another possible embodiment, the radio network may transmit the synchronization signal in a System Signature Index sequence, SSI, which has likewise been described above. In yet another possible embodiment, the radio network may broadcast the access information with a first periodicity and transmit the synchronization signal with a second periodicity shorter than the first periodicity, e.g. as shown in FIG. 2. It should be noted that actions 300 and 302 may be executed repeatedly any number of times and in any order. For example, action 302 may be executed several times before and/or after action 302 is executed, e.g. as illustrated in FIG. 2.

The above actions 300, 302 may be implemented in different ways in practice. For example, a control node such as an RNC or an O&M node may select which demodulation reference signal to use from the set of predefined demodulation reference signals, e.g. depending on the current traffic situation such as ongoing data communications, the number of wireless devices present in the radio coverage area, the number of random access transmissions, the amount of interference generated, and so forth, in order to enforce corresponding access parameters that are suitable or even optimal for the traffic situation. The control node may then instruct one or more base stations or the like to use the selected demodulation reference signal in action 300, and to transmit the synchronization signal in action 302 which is mapped to the selected demodulation reference signal. Furthermore, the access information may be broadcasted and the synchronization signal may be transmitted from one and the same base station or from different base stations, which has been described above for FIG. 2. It is also possible that all the above activities are performed by one and the same base station, or generally network node.

Various further embodiments are possible to employ by the radio network as follows. In one possible embodiment, the radio network may use the demodulation reference signal for broadcasting the access information over a specific area, and may further transmit the synchronization signal only in said specific area so that any wireless device present in said specific area is able to use corresponding access related parameters for performing random access. Thereby, the corresponding access related parameters will be enforced in that specific area while other access related parameters can be enforced in other areas in a similar manner so as to adapt the access procedure locally to different areas. This adaptation may also be made dynamically by switching between different demodulation reference signals and corresponding sets of access related parameters, so as to adapt the random access procedure to changes in the traffic situation, as described above. The performance in the radio network can thus be improved by employing suitable or even optimal access related parameters locally on a dynamic basis depending on the typically fluctuating traffic situation in each area.

In another possible embodiment, the radio network may further broadcast different synchronization signals in different sectors or antenna beams so that different access related parameters are valid in the different sectors or antenna beams. In that case, the radio network may also, according to another possible embodiment, monitor random access messages in each sector or antenna beam based on corresponding access related parameters applied in said sector or antenna beam.

In a further possible embodiment, different synchronization signals such as SS's may be associated to different antenna ports. In another possible embodiment, the set of predefined demodulation reference signals may be arranged in a predefined tree structure comprising multiple groups of demodulation reference signals, and the synchronization signal may in that case be mapped to at least one group of candidate demodulation reference signals in said tree structure. An example of such a tree structure will be outlined later below with reference to FIG. 5.

In another possible embodiment, the synchronization signal may be further associated with a predefined mapping to various properties of a physical channel used for broadcasting the access information, which the wireless device may be required to know and employ for demodulating and decoding the broadcasted access information. These physical channel properties may comprise at least one of: a physical channel format, a scrambling code and a Cyclic Redundancy Check, CRC, code. Thereby, the synchronization signal may be used for informing the device about the physical channel used for broadcasting the access information.

Figure 4:
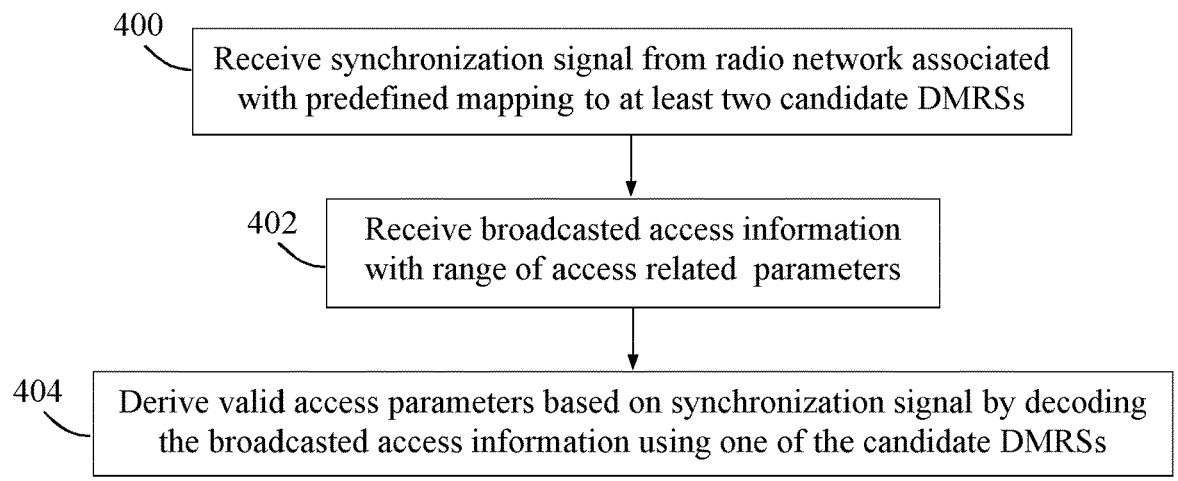
FIG. 4 is a flow chart illustrating a procedure performed by a wireless device, according to further possible embodiments.

An example of how the solution may be employed on the device side will now be described with reference to the flow chart in FIG. 4 which illustrates a procedure with actions performed by a wireless device, to accomplish the functionality described above. The wireless device is operative to handle access information related to how the radio network can be accessed in a radio coverage area served by the radio network.

A first action 400 illustrates that the wireless device receives from the radio network a synchronization signal associated with a predefined mapping to at least two candidate demodulation reference signals. In a possible embodiment, the wireless device may receive the synchronization signal in a System Signature Index sequence, SSI, which has been described above.

In a next shown action 402, the wireless device further receives broadcasted access information comprising a range of access parameters. Some examples of such access parameters have been described above. In another possible embodiment, the wireless device may receive the access information in an Access Information Table, AIT, which has been described above. The wireless device then derives valid access parameters from the broadcasted access information based on the synchronization signal, in an action 404, by demodulating the broadcasted access information using one of the at least two candidate demodulation reference signals.

Various further embodiments are possible to employ by the radio network as follows. In one possible embodiment, the wireless device may attempt to demodulate the broadcasted access information using the at least two candidate demodulation reference signals separately until the demodulation is successful. An example of a procedure when this embodiment is employed, will be described later below with reference to FIG. 8.

In a possible embodiment, the synchronization signal may be further associated with a predefined mapping to properties of a physical channel used for broadcasting the access information, where the physical channel properties comprise at least one of: a physical channel format, a scrambling code and a Cyclic Redundancy Check, CRC, code. In this case, the wireless device may attempt to demodulate the broadcasted access information based on said properties of the physical channel.

In another possible embodiment, the wireless device may proceed to perform random access towards the radio network according to the derived valid access parameters, that is by transmitting one or more access requests on a radio channel such as the above-mentioned Physical Random Access Channel, PRACH, using the derived access parameters.

Figure 5:
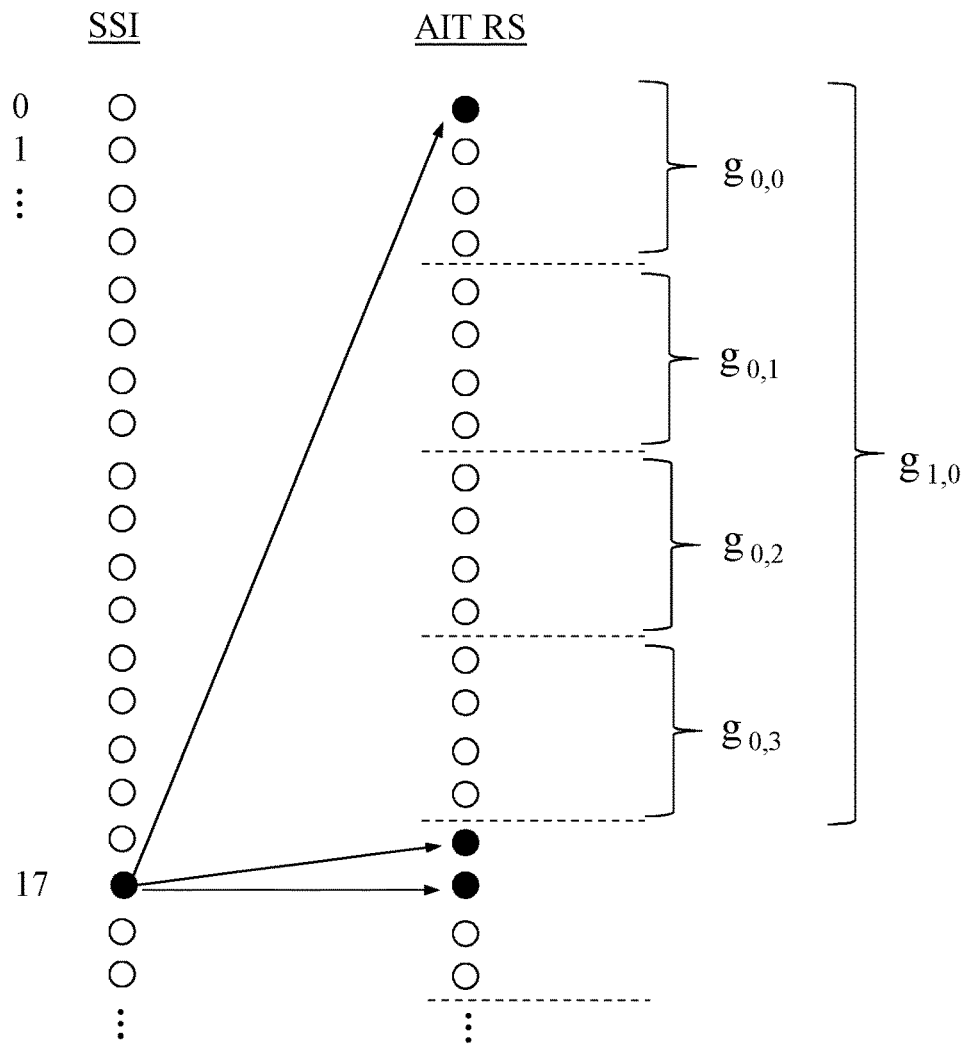
FIG. 5 is a diagram illustrating an example of how a synchronization signal SSI can be mapped to different candidate demodulation reference signals AIT RS, according to further possible embodiments.

An example of how a synchronization signal can be associated with a predefined mapping to two or more demodulation reference signals, is shown in FIG. 5 which schematically illustrates parts of a mapping table. In this example, a plurality of synchronization signals in the form of SS's are mapped to different predefined demodulation Reference Signals, RS, denoted "AIT RS" in the figure. Specifically, the synchronization signal SSI 17 is mapped to three demodulation reference signals, namely AIT RS 0, AIT RS 16 and AIT RS 17, as indicated by arrows. This mapping is predefined, i.e. known by both the network and any wireless device, as explained above.

So when a wireless device receives the synchronization signal SSI 17 from the radio network, the wireless device is able to identify AIT RS 0, AIT RS 16 and AIT RS 17 as three candidate demodulation reference signals, based on the predefined mapping. Thereby, the wireless device is further able to derive valid access parameters from broadcasted access information by demodulating the broadcasted access information using one of AIT RS 0, AIT RS 16 and AIT RS 17. The radio network is also able to use any of the demodulation reference signals AIT RS 0, AIT RS 16 and AIT RS 17 for broadcasting the access information, in order to enforce corresponding access parameters while the device has received the synchronization signal SSI 17.

It was mentioned above that the set of predefined demodulation reference signals may be arranged in a predefined tree structure comprising multiple groups of demodulation reference signals. An example of such a tree structure is shown in FIG. 5 where the tree structure comprises a first level of groups denoted $g_{0,0}$, $g_{0,1}$, $g_{0,2}$, $g_{0,3}$, and so forth, while the above-mentioned four groups in the first level are comprised in another group $g_{1,0}$ of a higher second level. It is thereby possible that the synchronization signal can be mapped to at least one group of candidate demodulation reference signals in this tree structure.

Figure 6:
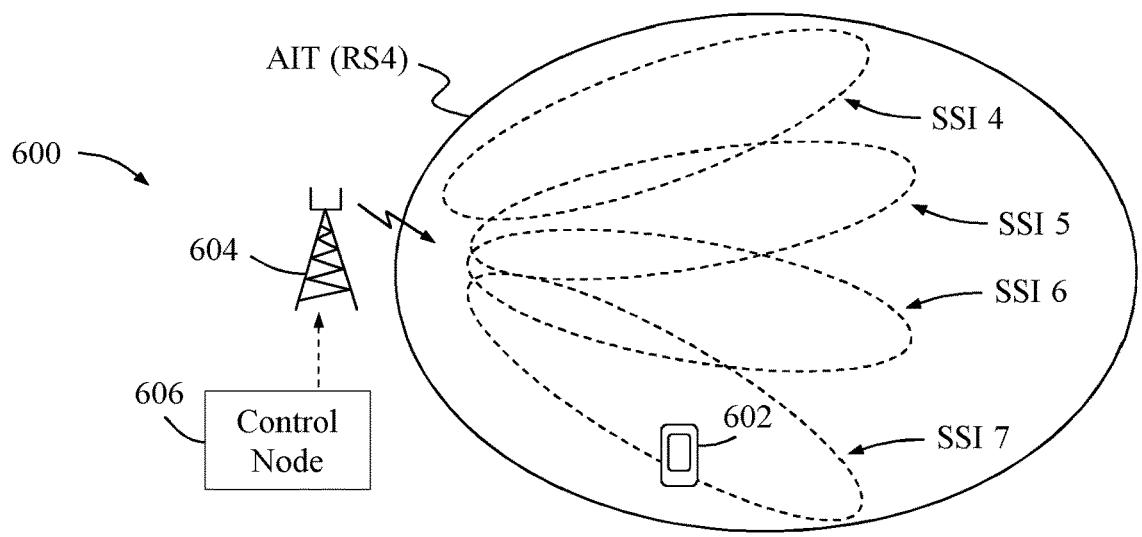
FIG. 6 is a communication scenario illustrating that a network node transmits different synchronization signals SSI over different sectors or antenna beams as mapped to the same reference signal AIT RS, according to further possible embodiments.
Figure 6:
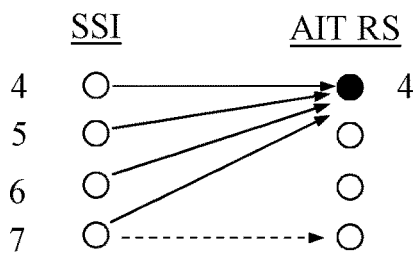

It was also mentioned above that the radio network may use a certain demodulation reference signal for broadcasting the access information over a specific area, such as a sector or antenna beam, and that the synchronization signal may be transmitted only in said specific area so that any wireless device therein can derive corresponding access related parameters for performing random access in that area. Two examples of this embodiment are shown in FIGS. 6 and 5. In FIG. 6, the radio network 600 comprises at least one base station 604 and a control node 606 which controls the base station 604 to broadcast access information and transmit synchronization signals as follows.

The base station 604 broadcasts the access information AIT over a relatively wide area using a demodulation reference signal denoted AIT RS 4. The base station 604 also transmits different synchronization signals over smaller sectors or antenna beams within the wide area, namely SSI 4, SSI 5, SSI 6 and SSI 7, as shown in the figure. A mapping table is also shown in FIG. 6 in which all synchronization signals SSI 4-7 are mapped to AIT RS 4. Thereby, any wireless device that receives any of the synchronization signals SSI 4-7 can identify the mapped demodulation reference signal AIT RS 4 and use it to demodulate the broadcasted access information and derive valid access parameters therefrom. For example, a wireless device 602 that receives the synchronization signal SSI 7 is thus able to identify and use the mapped demodulation reference signal AIT RS 4 accordingly.

Each of the synchronization signals SSI 4-7 is also mapped to one or more other demodulation reference signals than AIT RS 4, as exemplified by a dashed arrow indicating that SSI 7 is also mapped to AIT RS 7 according to the predefined mapping for SSI 7. As a result, the wireless device 602 may attempt to demodulate the broadcasted access information using the candidate demodulation reference signals AIT RS 4 and AIT RS 7 separately and the demodulation will thus be successful when using AIT RS 4.

A base station may for example be equipped with an advanced antenna solution that supports analogue beamforming in a set of pre-defined directions. In this case it may be an advantage for the base station 604 to know in which beam the wireless device 602 has the best reception for an upcoming downlink transmission, and this can be accomplished already from the random access procedure in the scenario of FIG. 6. Thereby, the base station 604 is able to transmit a Random Access Response, RAR, to the device 602 only in the downlink beam corresponding to the synchronization signal SSI 7 received and used by the device 302. The device 602 may thus indicate which downlink beam is the best by deriving and using random access parameters according to the SSI 7.

The base station may also have a limited capacity to perform base band processing in all different directions simultaneously and it may therefore be desirable to ensure that wireless devices in different downlink beams transmit their RACH preambles exactly when the base station searches for random access transmissions in the corresponding uplink beam. The base station may then be able to perform sequential processing of PRACH in each possible direction. Using the embodiment of FIG. 6 enables uplink reception beam-forming of PRACH while still ensuring good performance of the broadcasting of access information.

Figure 7:
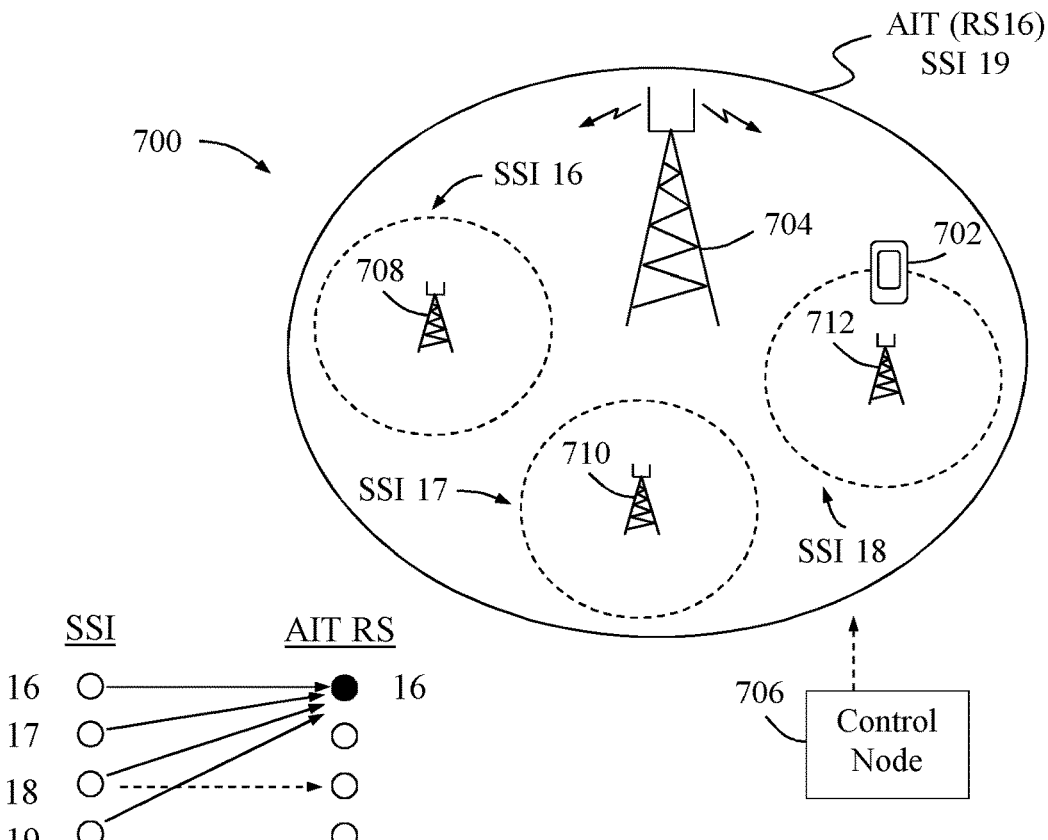
FIG. 7 is another communication scenario illustrating that three network nodes transmit different synchronization signals SSI over different areas as mapped to the same reference signal AIT RS, according to further possible embodiments.
Figure 7:
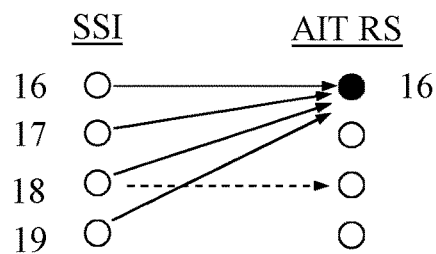

In FIG. 7, the radio network 700 comprises a base station 704 such as a macro node covering a wide area, three base stations 708, 710 and 712 covering smaller areas within the wide area, and a control node 706 which controls the base stations 704, 708-712 to broadcast access information and transmit synchronization signals as follows.

The base station 704 broadcasts the access information AIT over a relatively wide area using a demodulation reference signal denoted AIT RS 16. The base stations 708-712 and 704 transmit different synchronization signals SSI 16, SSI 17, SSI 18 and SSI 19, respectively, as shown in the figure. A mapping table is also shown in FIG. 7 in which the synchronization signals SSI 6-19 are all mapped to AIT RS 16. Thereby, any wireless device that receives any of the synchronization signals SSI 16-19 can identify the mapped demodulation reference signal AIT RS 19 and use it to demodulate the broadcasted access information and derive valid access parameters therefrom.

For example, a wireless device 702 that receives the synchronization signal SSI 18 is thus able to identify and use the mapped demodulation reference signal AIT RS 16 accordingly. Each of the synchronization signals SSI 16-19 is also mapped to one or more other demodulation reference signals than AIT RS 16, as exemplified by a dashed arrow indicating that SSI 18 is also mapped to AIT RS 16 according to the predefined mapping for SSI 18, and the wireless device 702 may attempt to demodulate the broadcasted access information accordingly.

Transmitting the AIT over a large area as in FIG. 7 enables so-called macro diversity gain. However, if the same SSI is also transmitted over the same large area, additional problems may occur since it may for example require RACH coordination between base station sites. In case the wireless device transmits a RACH pre-amble, any network node within the area will have a responsibility to ensure that a RAR message is transmitted in response to the wireless device. In case the network nodes cannot coordinate the RAR transmission, the wireless device will likely receive several RAR messages from the network transmitted from different base stations.

One way to avoid this may be to transmit a single AIT from base station 704 in FIG. 7 over the whole area, in this case using AIT RS 16, and still use different SS's in each smaller area covered by the base stations 708-712. The RACH related parameters used by the wireless device 702, such as the RACH-preamble, may in that case depend on which SSI has been received.

Figure 8:
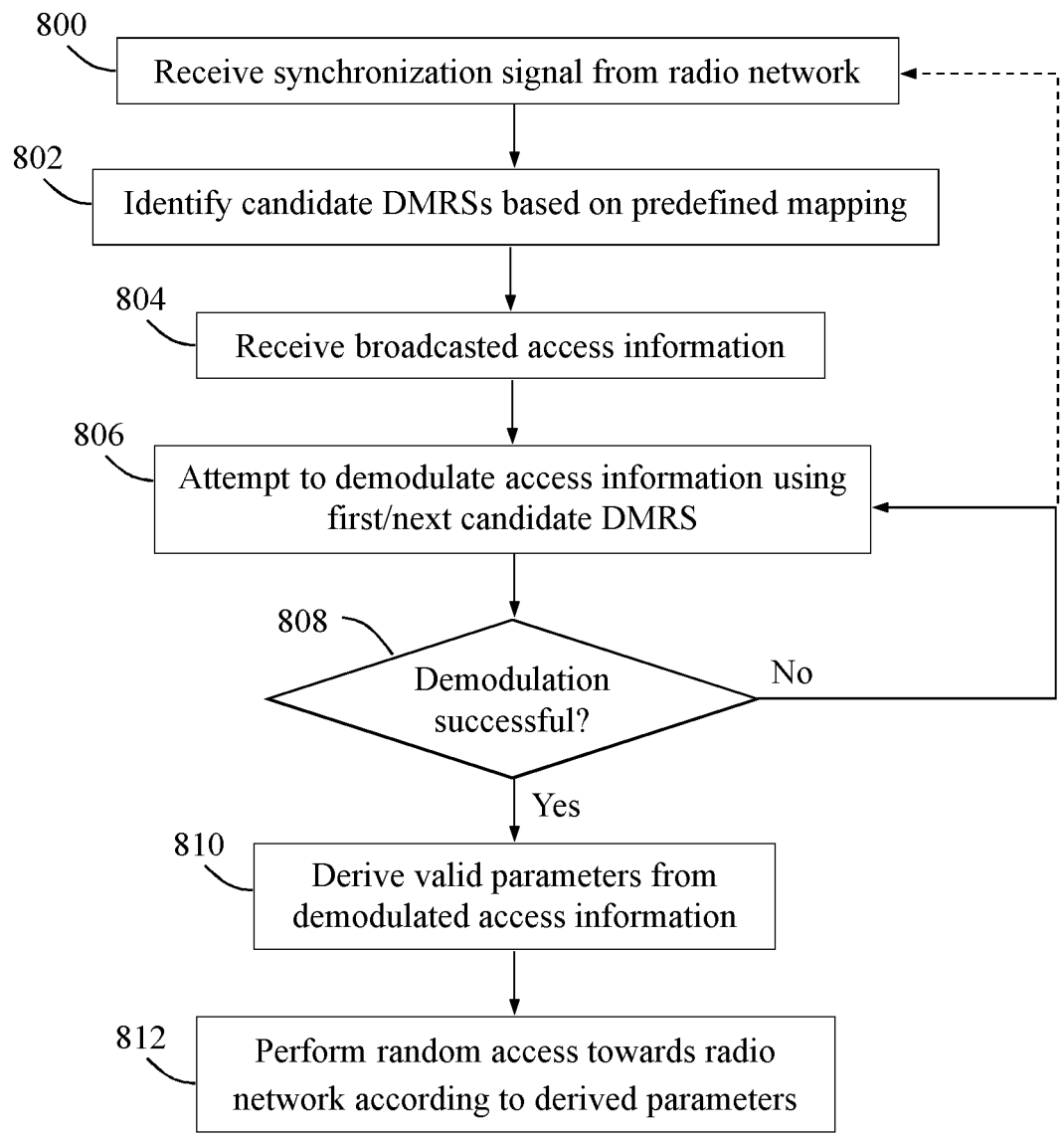
FIG. 8 is a flow chart illustrating a more detailed example of a procedure in a wireless device, according to further possible embodiments.

A more detailed example of a procedure where a wireless device operates in a radio network according to some of the above-described embodiments, will now be described with reference to the flow chart in FIG. 8. A first action 800 illustrates that the wireless device receives from the radio network a synchronization signal associated with a pre-defined mapping to a number of demodulation reference signals, basically as described above for action 400. In a next action 802, the wireless device identifies the candidate demodulation reference signals, DMRSs, according to the predefined mapping. The wireless device further receives broadcasted access information comprising a range of access parameters, in an action 804.

The wireless device then attempts to demodulate the broadcasted access information using a first candidate DMRS of the previously identified candidate demodulation reference signals, in an action 806. If the wireless device determines in a next action 808 that the demodulation attempt was successful, the wireless device is able to decode the broadcasted access information and derive valid access parameters from the demodulated access information, in a following action 810. A final action 812 illustrates that the wireless device performs random access towards the radio network by using the derived access parameters.

However, if the wireless device determines in action 808 that the demodulation attempt was not successful, the wireless device will return to action 806 and attempt to demodulate the broadcasted access information using a next candidate demodulation reference signal DMRS. In this way, actions 806 and 808 will be repeated either until the correct candidate DMRS is used in a successful demodulation attempt such that actions 810 and 812 can be executed, or until all the identified candidate demodulation reference signals have been attempted to no avail. In the latter case, the wireless device will have to return to action 800, as indicated by a dashed arrow, and receive another synchronization signal from the radio network and the whole procedure can be repeated in the manner described above.

Figure 9:
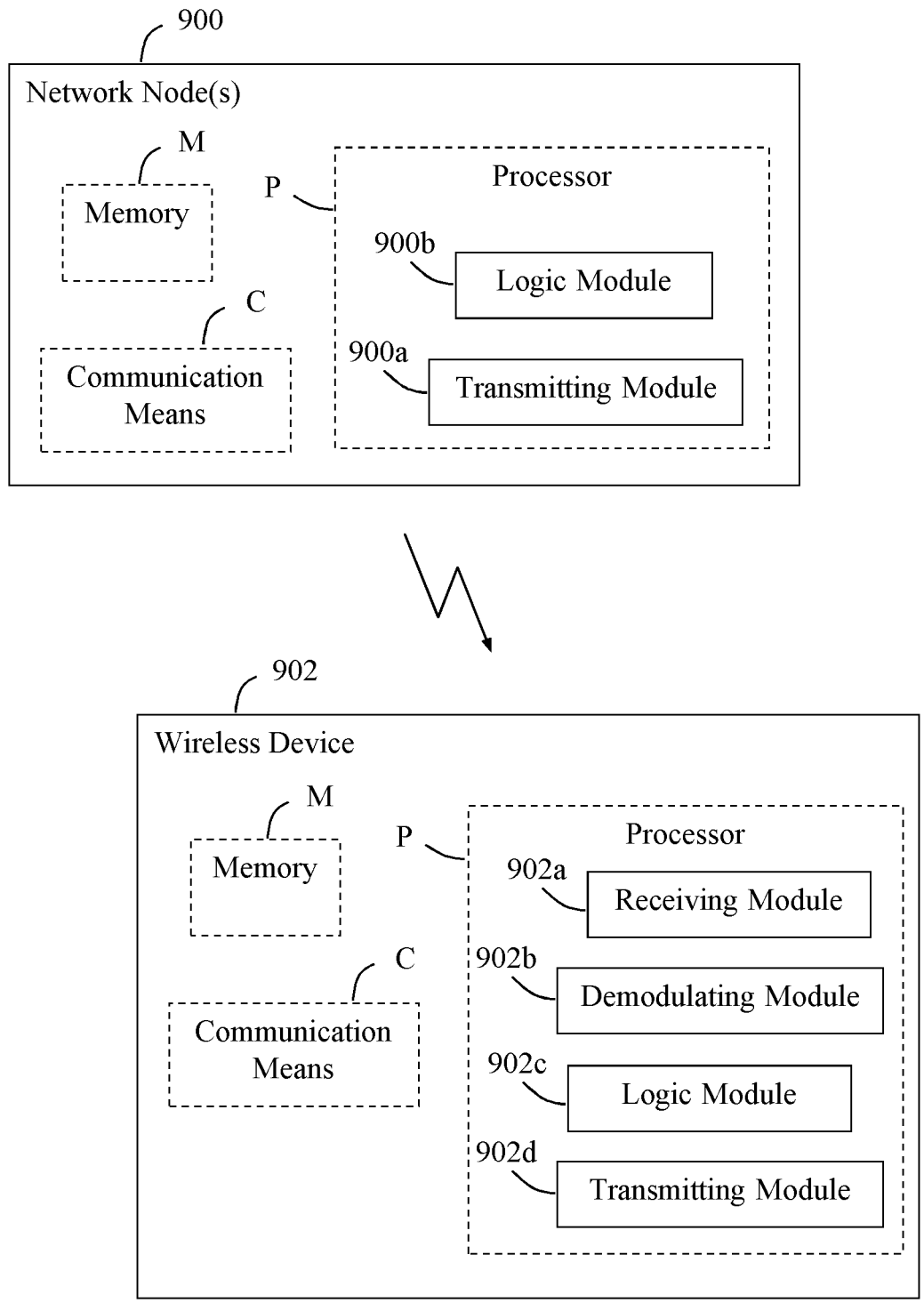
FIG. 9 is a block diagram illustrating at least one network node of a radio network and a wireless device in more detail, according to further possible embodiments.

The block diagram in FIG. 9 illustrates a detailed but non-limiting example of how at least one network node 900 of a radio network and a wireless device 902, respectively, may be structured to bring about the above-described solution and embodiments thereof. In this figure, the at least one network node 900 and the wireless device 902 may be configured to operate according to any of the examples and embodiments of employing the solution as described above, where appropriate, and as follows. Each of the at least one network node 900 and the wireless device 902 is shown to comprise a processor "P", a memory "M" and a communication circuit "C" with suitable equipment for transmitting and receiving radio signals in the manner described herein.

The communication circuit C in each of the at least one network node 900 and the wireless device 902 thus comprises equipment configured for communication with each other over a radio interface using a suitable protocol for radio communication depending on the implementation. The solution is however not limited to any specific types of data or protocols.

The at least one network node 900 comprises means configured or arranged to perform the actions 300-302 of the flow chart in FIG. 3 in the manner described above. Further, the wireless device 902 comprises means configured or arranged to perform the actions 400-404 of the flow chart in FIG. 4 in the manner described above. The actions of FIGS. 3 and 4 may be performed by means of functional modules in the respective processor P in the at least one network node 900 and the wireless device 902.

The at least one network node 900 is arranged to handle access information related to how the radio network can be accessed by at least one wireless device, such as device 902, present in a radio coverage area served by the radio network. The at least one network node 900 thus comprises the processor P and the memory M, said memory comprising instructions executable by said processor, whereby the at least one network node 900 is operative as follows.

The at least one network node 900 is operative to broadcast access information comprising a range of access parameters, using a demodulation reference signal out of a set of predefined demodulation reference signals. This broadcasting operation may be performed by a transmitting module 900a in the at least one network node 900, e.g. in the manner described for action 300 above.

The at least one network node 900 is also operative to transmit a synchronization signal associated with a pre-defined mapping to at least two candidate demodulation reference signals including the demodulation reference signal used for broadcasting the access information. Thereby, the at least one wireless device is enabled to demodulate the broadcasted access information and derive valid access related parameters from the broadcasted access information, based on the synchronization signal transmitted by the at least one network node 900. This transmitting operation may be performed by the transmitting module 900a, e.g. in the manner described for action 302 above. The at least one network node 900 may further comprise a logic module 900b for deciding which demodulation reference signal to use when broadcasting the access information and which synchronization signal to transmit as above. Alternatively, the at least one network node 900 may be instructed in this respect by a control node, e.g. any of the above-mentioned control nodes 606 and 706.

The wireless device 902 is arranged to handle access information related to how a radio network can be accessed in a radio coverage area served by the radio network. The wireless device 902 comprises a processor P and a memory M, said memory comprising instructions executable by said processor whereby the wireless device 902 is operative as follows.

The wireless device 902 is operative to receive from the radio network a synchronization signal associated with a predefined mapping to at least two candidate demodulation reference signals. This receiving operation may be performed by a receiving module 902a in the wireless device 902, e.g. in the manner described for action 400 above. The wireless device 902 is also operative to receive broadcasted access information comprising a range of access parameters. This further receiving operation may be performed by the receiving module 902a, e.g. in the manner described for action 402 above.

The wireless device 902 is operative to derive valid access parameters from the broadcasted access information based on the synchronization signal by demodulating the broadcasted access information using one of the at least two candidate demodulation reference signals. This operation may be performed by a demodulating module 902a in the wireless device 902, e.g. in the manner described for action 400 above. The wireless device 902 may further comprise a logic module 902c e.g. for identifying the at least two candidate demodulation reference signals, and a transmitting module 902d e.g. for performing random access towards the radio network according to the derived valid access parameters.

It should be noted that FIG. 9 illustrates various functional modules in the at least one network node 900 and the wireless device 902, respectively, and the skilled person is able to implement these functional modules in practice using suitable software and hardware. Thus, the solution is generally not limited to the shown structures of the at least one network node 900 and the wireless device 902, and the functional modules 900a-b and 902a-d therein may be configured to operate according to any of the features and embodiments described in this disclosure, where appropriate.

The functional modules 900a-b and 902a-d described above can be implemented in the at least one network node 900 and the wireless device 902, respectively, by means of program modules of a respective computer program comprising code means which, when run by the processor P causes the at least one network node 900 and the wireless device 902 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the at least one network node 900 and the wireless device 902 in the form of a memory having a computer readable medium and being connected to the processor P. The computer program product or memory M in each of the at least one network node 900 and the wireless device 902 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 900 and wireless device 902.

The solution described herein may be implemented in each of the at least one network node 900 and the wireless device 902 by a computer program comprising instructions which, when executed on at least one processor, cause the at least one processor to carry out the actions according to any of the above embodiments, where appropriate. The solution may also be implemented at each of the at least one network node 900 and the wireless device 902 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "network node", "wireless device", "access information", "demodulation reference signal", "synchronization signal" and "access related parameters" have been used throughout this disclosure, although any other corresponding entities, signals, and/or parameters could also be used having the features and characteristics described here. The solution is defined by the appended claims.

The invention claimed is:

1. A method performed by a radio network comprising at least one network node, for handling access information related to how the radio network can be accessed by at least one wireless device present in a radio coverage area served by the radio network, the method comprising:
   broadcasting access information comprising a range of access parameters, using a demodulation reference signal out of a set of predefined demodulation reference signals; and
   transmitting a synchronization signal associated with a predefined mapping to at least two candidate demodulation reference signals including the demodulation reference signal used for broadcasting the access information, thereby enabling the at least one wireless device to identify the at least two candidate demodulation reference signals, based on the transmitted synchronization signal and the predefined mapping, demodulate said broadcasted access information using one of the identified demodulation reference signals, and derive valid access related parameters from the broadcasted access information.

2. The method of claim 1, wherein the radio network broadcasts the access information in an Access Information Table (AIT).

3. The method of claim 1, wherein the radio network transmits the synchronization signal in a System Signature Index (SSI) sequence.

4. The method of claim 1, wherein the radio network broadcasts the access information with a first periodicity and transmits the synchronization signal with a second periodicity shorter than the first periodicity.

5. The method of claim 1, wherein the radio network uses the demodulation reference signal for broadcasting the access information over a specific area, and transmits the synchronization signal only in said specific area so that any wireless device present in said specific area is able to use corresponding access related parameters for performing random access.

6. The method of claim 5, wherein the radio network broadcasts different synchronization signals in different sectors or antenna beams so that different access related parameters are valid in the different sectors or antenna beams.

7. The method of claim 6, wherein the radio network monitors random access messages in each sector or antenna beam based on corresponding access related parameters applied in said sector or antenna beam.

8. The method of claim 1, wherein the set of predefined demodulation reference signals are arranged in a predefined tree structure comprising multiple groups of demodulation reference signals, and the synchronization signal is mapped to at least one group of candidate demodulation reference signals in said tree structure.

9. The method of claim 1, wherein the synchronization signal is further associated with a predefined mapping to properties of a physical channel used for broadcasting the access information comprising at least one of: a physical channel format, a scrambling code and a Cyclic Redundancy Check (CRC) code.

10. A method performed by a wireless device in a radio network, for handling access information related to how the radio network can be accessed in a radio coverage area served by the radio network, the method comprising:
receiving from the radio network a synchronization signal associated with a predefined mapping to at least two candidate demodulation reference signals;
receiving broadcasted access information comprising a range of access parameters; and
deriving valid access parameters from the broadcasted access information based on the synchronization signal by demodulating the broadcasted access information using one of the at least two candidate demodulation reference signals.

11. The method of claim 10, wherein the wireless device attempts to demodulate the broadcasted access information using the at least two candidate demodulation reference signals separately until the demodulation is successful.

12. The method of claim 10, wherein the synchronization signal is further associated with a predefined mapping to properties of a physical channel used for broadcasting the access information comprising at least one of: a physical channel format, a scrambling code and a Cyclic Redundancy Check (CRC) code, and wherein the wireless device attempts to demodulate the broadcasted access information based on said properties of the physical channel.

13. The method of claim 10, wherein the wireless device performs random access towards the radio network according to the derived valid access parameters.

14. The method of claim 10, wherein the wireless device receives the broadcasted access information in an Access Information Table (AIT).

15. The method of claim 10, wherein the wireless device receives the synchronization signal in a System Signature Index (SSI) sequence.

16. A wireless device arranged to handle access information related to how a radio network can be accessed in a radio coverage area served by the radio network, the wireless device comprising:
a processor; and
a memory operatively connected to the processor, said memory comprising instructions executable by said processor whereby the wireless device is operative to:
receive from the radio network a synchronization signal associated with a predefined mapping to at least two candidate demodulation reference signals,
receive broadcasted access information comprising a range of access parameters, and
derive valid access parameters from the broadcasted access information based on the synchronization signal by demodulating the broadcasted access information using one of the at least two candidate demodulation reference signals.

17. The wireless device of claim 16, wherein the wireless device is operative to attempt to demodulate the broadcasted access information using the at least two candidate demodulation reference signals separately until the demodulation is successful.

18. The wireless device of claim 16, wherein the synchronization signal is further associated with a predefined mapping to properties of a physical channel used for broadcasting the access information comprising at least one of: a physical channel format, a scrambling code and a Cyclic Redundancy Check (CRC) code, and wherein the wireless device is operative to attempt to demodulate the broadcasted access information based on said properties of the physical channel.

19. The wireless device of claim 18, wherein the wireless device is operative to perform random access towards the radio network according to the derived valid access parameters.

20. The wireless device of claim 16, wherein the wireless device is operative to receive the broadcasted access information in an Access Information Table (AIT).

21. The wireless device of claim 16, wherein the wireless device is operative to receive the synchronization signal in a System Signature Index (SSI) sequence.

22. A network node of radio network, the network node being arranged to handle access information related to how the radio network can be accessed by at least one wireless device present in a radio coverage area served by the radio network, the network node comprising:
a processor; and
a memory operatively connected to said processor, said memory comprising instructions executable by said processor whereby the radio network is operative to:
broadcast access information comprising a range of access parameters, using a demodulation reference signal out of a set of predefined demodulation reference signals, and
transmit a synchronization signal associated with a predefined mapping to at least two candidate demodulation reference signals including the demodulation reference signal used for broadcasting the access information, thereby enabling the at least one wireless device to identify the at least two candidate demodulation reference signals, based on the transmitted synchronization signal and the predefined mapping, demodulate said broadcasted access information using one of the identified demodulation reference signals, and derive valid access related parameters from the broadcasted access information.

23. The network node of claim 22, wherein the network node is operative to broadcast the access information in an Access Information Table (AIT).

24. The network node of claim 22, wherein the network node is operative to transmit the synchronization signal in a System Signature Index (SSI) sequence.

25. The network node of claim 22, wherein the network node is operative to broadcast the access information with a first periodicity and to transmit the synchronization signal with a second periodicity shorter than the first periodicity.

26. The network node of claim 22, wherein the network node is operative to use the demodulation reference signal for broadcasting the access information over a specific area, and to transmit the synchronization signal only in said specific area so that any wireless device present in said specific area is able to use corresponding access related parameters for performing random access.

27. The network node of claim 26, wherein the network node is operative to broadcast different synchronization signals in different sectors or antenna beams so that different access related parameters are valid in the different sectors or antenna beams.

28. The network node of claim 27, wherein the network node is operative to monitor random access messages in each sector or antenna beam based on corresponding access related parameters applied in said sector or antenna beam.

29. The network node of claim 22, wherein the set of predefined demodulation reference signals are arranged in a predefined tree structure comprising multiple groups of demodulation reference signals, and the synchronization signal is mapped to at least one group of candidate demodulation reference signals in said tree structure.

30. The network node of claim 22, wherein the synchronization signal is further associated with a predefined mapping to properties of a physical channel used for broadcasting the access information comprising at least one of: a physical channel format, a scrambling code and a Cyclic Redundancy Check (CRC) code.

31. A method performed by a wireless device in a radio network, for handling access information related to how the radio network can be accessed in a radio coverage area served by the radio network, the method comprising:
  receiving from the radio network a synchronization signal associated with a predefined mapping to at least two candidate demodulation reference signals;
  identifying the at least two candidate demodulation reference signals, based on the received synchronization signal and the predefined mapping;
  receiving broadcasted access information comprising a range of access parameters; and
  deriving valid access parameters from the broadcasted access information based on the synchronization signal by demodulating the broadcasted access information using one of the at least two candidate demodulation reference signals.

32. A wireless device arranged to handle access information related to how a radio network can be accessed in a radio coverage area served by the radio network, the wireless device comprising:
  a processor; and
  a memory operatively connected to the processor, said memory comprising instructions executable by said processor whereby the wireless device is operative to:
    receive from the radio network a synchronization signal associated with a predefined mapping to at least two candidate demodulation reference signals,
    identify the at least two candidate demodulation reference signals, based on the received synchronization signal and the predefined mapping,
    receive broadcasted access information comprising a range of access parameters, and
    derive valid access parameters from the broadcasted access information based on the synchronization signal by demodulating the broadcasted access information using one of the at least two candidate demodulation reference signals.

* * * * *